(12) United States Patent
Shinoda

(10) Patent No.: US 11,644,602 B2
(45) Date of Patent: May 9, 2023

(54) OPTICAL ELEMENT, OPTICAL ELEMENT STAMPER STRUCTURE, PRINTED ARTICLE, AND METHOD FOR MANUFACTURING OPTICAL ELEMENT

(71) Applicant: TOPPAN PRINTING CO., LTD., Tokyo (JP)

(72) Inventor: Koichi Shinoda, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 706 days.

(21) Appl. No.: 16/196,338

(22) Filed: Nov. 20, 2018

(65) Prior Publication Data
US 2019/0086583 A1    Mar. 21, 2019

Related U.S. Application Data

(63) Continuation of application No. PCT/JP2017/019611, filed on May 25, 2017.

(30) Foreign Application Priority Data

May 25, 2016  (JP) .............................. JP2016-104419

(51) Int. Cl.
*G02B 3/08*    (2006.01)
*B29C 59/02*   (2006.01)
(Continued)

(52) U.S. Cl.
CPC .............. *G02B 3/08* (2013.01); *B29C 59/02* (2013.01); *B29C 59/04* (2013.01);
(Continued)

(58) Field of Classification Search
CPC .......... G02B 3/08; G02B 5/021; G02B 5/045; G02B 3/0031; G02B 3/0056; G02B 3/0043; B29D 11/00288; B29D 11/0048
See application file for complete search history.

(56) References Cited

U.S. PATENT DOCUMENTS 7,054,068 B2 *   5/2006  Yoshida ............... G02B 3/0031
                                                      359/455
2006/0062969 A1 *   3/2006  Honda .................... G02B 5/00
                                                      428/172
(Continued)

FOREIGN PATENT DOCUMENTS

GB     2 021 807       12/1979
JP     06-114849 A     4/1994
(Continued)

OTHER PUBLICATIONS

International Search Report dated Aug. 22, 2017 in corresponding International Application No. PCT/JP2017/019611.
(Continued)

*Primary Examiner* — Alicia M Harrington (57) ABSTRACT

By providing a rib portion 40 having a constant height in the range from 50% to 120% of the height of the highest point of a split lens structure between a plurality of split lenses, even when roll forming is performed at a high speed, trapping of air bubbles can be inhibited, and resin flow can be promoted; therefore, an optical element 10 having a surface on which a lens shape is formed and having a special optical effect can be obtained with few structural defects and high productivity.

2 Claims, 6 Drawing Sheets

(51) Int. Cl.
  *B29C 59/04* (2006.01)
  *G02B 3/06* (2006.01)
  *G02B 3/00* (2006.01)
  *B29D 11/00* (2006.01)

(52) U.S. Cl.
  CPC .... *B29D 11/0048* (2013.01); *B29D 11/00288* (2013.01); *G02B 3/00* (2013.01); *G02B 3/06* (2013.01)

(56) References Cited

U.S. PATENT DOCUMENTS

| | | | |
|---|---|---|---|
| 2010/0118516 A1* | 5/2010 | Nakagome | G02B 5/0278 362/97.1 |
| 2015/0124315 A1 | 5/2015 | Sasahara | |

FOREIGN PATENT DOCUMENTS

| | | | | |
|---|---|---|---|---|
| JP | 11-300768 | | 11/1999 | |
| JP | 2001-47453 | | 2/2001 | |
| JP | 2001-62853 | | 3/2001 | |
| JP | 2004-98538 | | 4/2004 | |
| JP | 2009-75366 | | 4/2009 | |
| JP | 2010-160438 | | 7/2010 | |
| JP | 2011-83998 | | 4/2011 | |
| JP | 2011-134560 | | 7/2011 | |
| JP | 2012-199063 | | 10/2012 | |
| JP | 2012199063 | * | 10/2012 | ............... G02B 5/02 |
| JP | 2016001306 A | * | 1/2016 | |
| JP | 2016-060046 A | | 4/2016 | |
| WO | WO 00/42469 | | 7/2000 | |
| WO | WO-0232653 A1 | * | 4/2002 | ........... B29C 43/222 |
| WO | WO 2014/119751 A1 | | 8/2014 | |

OTHER PUBLICATIONS

Written Opinion of International Searching Authority dated Aug. 22, 2017 in corresponding International Application No. PCT/JP2017/019611.

Extended European Search Report dated May 23, 2019 in corresponding European Patent Application No. 17802895.7.

European Office Action dated Feb. 6, 2020 in European Patent Application No. 17802895.7 (6 pages).

English Translation by WIPO of the International Preliminary Report on Patentability dated Dec. 6, 2018 in corresponding International Patent Application No. PCT/JP2017/019611, 10 pages.

First Office Action dated May 25, 2021 in corresponding Japanese Patent Application No. 2018-519615 (7 pages) (7 pages English Translation).

* cited by examiner

OPTICAL ELEMENT, OPTICAL ELEMENT STAMPER STRUCTURE, PRINTED ARTICLE, AND METHOD FOR MANUFACTURING OPTICAL ELEMENT

CROSS-REFERENCE TO RELATED APPLICATIONS

This is a Continuation Application of PCT Application No. PCT/JP2017/019611, filed May 25, 2017 and based upon and claiming the benefit of priority from prior Japanese Patent Application No. 2016-104419, filed May 25, 2016, the entire contents of which are incorporated herein by reference.

BACKGROUND OF THE INVENTION

1. Field of the Invention

The present invention relates to an optical element, an optical element stamper structure, printed article, and a method for manufacturing an optical element, and more particularly to those which have a surface on which a split lens structure is formed and can be used as a film-like product such as an embossed film having a special optical effect, and which can manufacture the optical element with no defects, higher quality, and higher productivity.

2. Description of the Related Art

In recent years, various types of films, such as an embossed film having an antireflection effect, a planar lens such as a lenticular lens or a fly-eye lens, a light diffusing film, a brightness enhancing film, an optical waveguide, and a prism sheet have been used for optical devices such as a display and lighting. As such a film, a film with a surface on which a regular concavo-convex shape is formed is common, and various manufacturing methods are known as a method for forming such a regular concavo-convex shape (see, for example, Jpn. Pat. Appln. KOKAI Publication No. H11-300768, and Jpn. Pat. Appln. KOKAI Publication No. 2001-62853).

For example, Jpn. Pat. Appln. KOKAI Publication No. H11-300768 discloses a technique of applying a resin to the surface of a stamper cylinder on which a regular concavo-convex shape is formed, sandwiching a film that continuously runs between the stamper cylinder and an impression cylinder, curing the resin by irradiating the resin with ionizing radiation with the resin of the stamper cylinder brought into contact with the film, and then winding the film around a peeling roll, and peeling the film from the stamper cylinder thereafter.

Jpn. Pat. Appln. KOKAI Publication No. 2001-62853 also discloses a method of applying a resin in advance to the surface of a film that continuously runs, sandwiching the film between an impression cylinder and a stamper cylinder on which a regular lens shape is formed, curing the resin by irradiating the resin with ionizing radiation with the concavo-convex shape of the stamper cylinder transferred to the resin, and then winding the film around a peeling roll and peeling the film from the stamper cylinder.

BRIEF SUMMARY OF THE INVENTION

In the above manufacturing methods, as the conveying speed is increased, air may be trapped between the curable resin film on the film surface and the stamper cylinder, and defects due to air bubbles may be caused on the film surface, which has been an obstacle to improvement in productivity. In particular, in the method disclosed in Jpn. Pat. Appln. KOKAI Publication No. H11-300768, a retention portion in which a resin is pushed and spread in the width direction while staying in the stamper cylinder is formed, which raises a concern to destabilize film formation, and has a problem that condition setting becomes more difficult as the speed increases.

The present invention has been made in view of such circumstances, and is intended to provide an optical element, printed article, an optical element stamper structure, and a method for manufacturing the optical element suitable for manufacturing an optical element with a surface on which a split lens structure is formed, with less defects, higher quality, and higher productivity.

According to an aspect of the present invention, in the first invention, an optical element, comprises a transparent substrate, a lens layer provided on the transparent substrate, and made of a transparent material including a split lens structure including a plurality of split lenses into which the split lens structure is divided by split lens surfaces, and a rib portion formed between the split lenses and having a constant structure height in a range from 50% to 120% of a height of a highest point of the split lens structure.

This first invention can promote the resin flow and suppress trapping of air bubbles even when roll forming is performed at a high speed, and thus can reduce defects in structure, and increase productivity.

According to an aspect of the present invention, in the second invention, the split lens structure includes a blazed structure, linear Fresnel lens structure, or cylindrical lens array structure in which the split lenses are arranged in parallel, and the rib portion is linearly formed in a direction orthogonal to the split lens surfaces.

The second invention provides an optical element having less defects with a structure including any one of a linear split lens structure of a blazed structure, a linear Fresnel lens structure, or a cylindrical lens array structure.

According to an aspect of the present invention, in the third invention, the split lens structure includes a Fresnel lens structure or micro Fresnel lens array structure in which the split lenses are arranged concentrically, and the rib portion is linearly formed to pass through a center of a concentric circle of each of the split lenses.

The third invention provides an optical element having a concentric split lens structure and having less defects by making the split lens structure have a Fresnel lens structure or a micro Fresnel lens array structure and making the rib portion or the groove portion have a linear structure passing through the center of each Fresnel lens structure.

According to an aspect of the present invention, in the fourth invention, a width of the rib portion is narrow on an outer peripheral side of the concentric circle.

The fourth invention decreases the fluidity of the molding resin along the rib portion, and thus allows the molding resin to go around the split lens structure, and improves formability.

According to an aspect of the present invention, in the fifth invention, an optical element stamper structure, comprises a transparent substrate, a lens layer provided on the transparent substrate, and made of a transparent material including a lens-like intaglio portion including a plurality of split lenses into which the lens-like intaglio portion is divided by split lens surfaces, a groove portion formed between the split lenses and having a constant structure depth in a range from 50% to 120% of a height of a lowest point of the lens-like intaglio portion.

The fifth invention can promote the resin flow and suppress trapping of air bubbles even when roll forming is performed at a high speed, and thus can reduce defects in structure, and increase productivity.

According to an aspect of the present invention, in the sixth invention, the lens-like intaglio portion includes a blazed structure, linear Fresnel lens structure, or cylindrical lens array structure in which the split lenses are arranged in parallel, and the groove portion is linearly formed in a direction orthogonal to the split lens surfaces.

The sixth invention provides an optical element having less defects with a structure including any one linear split lens structure of a blazed structure, a linear Fresnel lens structure, or a cylindrical lens array structure.

According to an aspect of the present invention, in the seventh invention, the lens-like intaglio portion includes a Fresnel lens structure or micro Fresnel lens array structure in which the split lenses are arranged concentrically, and the groove portion is linearly formed to pass through a center of a concentric circle of each of the split lenses.

The seventh invention provides an optical element having a concentric split lens structure and having less defects by making the split lens structure have a Fresnel lens structure or a micro Fresnel lens array structure and making the rib portion have a linear structure passing through the center of each Fresnel lens structure.

According to an aspect of the present invention, in the eighth invention, a width of the groove portion is narrow on an outer peripheral side of the concentric circles.

The eighth invention decreases the fluidity of the molding resin along the groove portion, and thus allows the molding resin to go around the split lens structure, and improves formability.

According to an aspect of the present invention, in the ninths invention, printed article comprises the optical element.

The seventh invention provides printed article having an excellent optical effect by using the optical elements of the first to fourth inventions.

According to an aspect of the present invention, in the tenth invention, a method for manufacturing an optical element including a split lens structure including a plurality of split lenses into which the split lens structure is divided by split surfaces, the method comprises supplying a transparent substrate film, supplying a transparent resin onto a surface of the substrate film on which the split lens structure is formed, pressing the substrate film by a pressing roll to a mold roll including a stamper structure corresponding to the split lenses and having a surface on which a groove portion is formed, the groove portion formed through the stamper structure, having a constant structure depth in a range from 50% to 120% of a depth of a lowest point of the stamper structure, curing the transparent resin, and peeling the substrate film from the mold roll.

The tenth invention provides a method for manufacturing an optical element. This enables roll forming of an optical element.

According to an aspect of the present invention, in the eleventh invention, a width of the groove portion becomes narrower in a flow direction of the transparent resin.

The eleventh invention decreases the fluidity of the molding resin along the groove portion, and thus allows the molding resin to go around the split lens structure, and improves formability.

DETAILED DESCRIPTION OF THE INVENTION

Hereinafter, embodiments of the present invention will be described in detail with reference to the drawings. Throughout the drawings, structural elements that perform the same function or similar functions are assigned with the same reference numeral, and redundant descriptions will be omitted.

Figure 1:
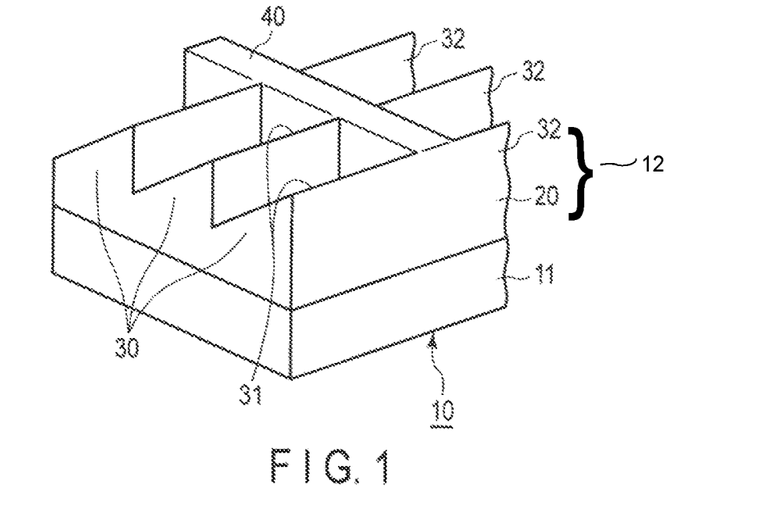
FIG. 1 is a perspective view showing a main part of an optical element according to a first embodiment of the present invention.
Figure 2:
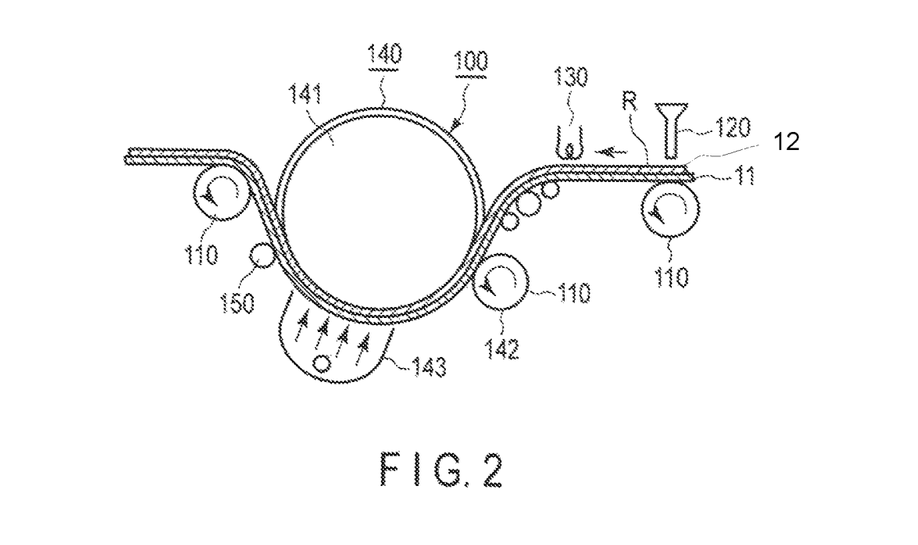
FIG. 2 is an explanatory view schematically showing a manufacturing apparatus for manufacturing the optical element.
Figure 3:
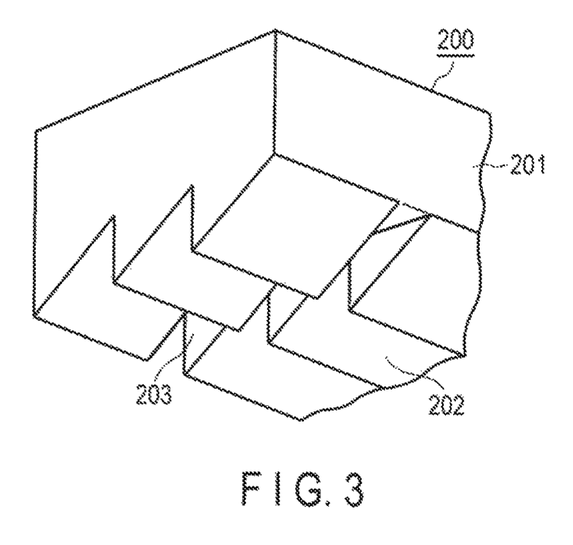
FIG. 3 is a perspective view showing a main part of a stamper structure incorporated in the manufacturing apparatus.

FIG. 1 is a perspective view showing a main part of an optical element 10 according to a first embodiment of the present invention, FIG. 2 is an explanatory view schematically showing a manufacturing apparatus 100 for manufacturing the optical element 10, and FIG. 3 is a perspective view showing a main part of a stamper structure 200 incorporated in the manufacturing apparatus 100.

The optical element 10 includes a lens layer 12 made of a transparent material on a transparent substrate (substrate film) 11. In the lens layer 12, a split lens structure 20 and a rib portion 40 are formed. As the material of the lens layer 12, an ultraviolet-curable resin R is used. The split lens structure 20 includes a plurality of split lenses 30, and the split lenses 30 each include a reflecting surface 31 and a split lens surface 32 which is a partition between split lenses 30. The rib portion 40 is formed between the split lenses 30. The rib portion 40 extends in the direction perpendicular to the surfaces of the split lens surfaces 32. Here, the length in the perpendicular direction from the surface of the transparent substrate 11, i.e., the lowest position of the split lens structure 20, is defined as the height. The height of the highest points of the split lens structure 20 is equal to the height of the rib portion 40, and the apexes are shared. The structure depth refers to a component in the direction perpendicular to the surface of the transparent substrate 11 from the highest positions of the split lens structure 20 to the transparent substrate 11 side.

As the material of the transparent substrate 11, various resins may be used; specifically, polyethylene, polypropylene, polyvinyl chloride, polyvinylidene chloride, polyvinyl acetate, polyester, polyolefin, acrylic, polystyrene, polycarbonate, polyamide, PET (polyethylene terephthalate), biaxially-stretched polyethylene terephthalate, polyethylene naphthalate, polyamide imide, polyimide, aromatic polyamide, cellulose acylate, cellulose triacetate, cellulose acetate propionate, cellulose diacetate, and the like may be used. As the material of the transparent substrate 11, a film or sheet made of a resin having high light transparency is preferable. An inorganic material such as glass may also be used.

The transparent substrate 11 does not necessarily have a single layer structure, and may have a structure including two or more layers. However, when curing by ultraviolet rays (ionizing radiation) is performed from the transparent substrate 11 side, the material of the transparent substrate 11 needs to be one that transmits applied ultraviolet rays.

In general, the width of the transparent substrate 11 is 0.1 to 1.5 m. The length of the transparent substrate 11 is generally 100 to 100000 m. The thickness of the transparent substrate 11 is generally 12 to 250 μm. The transparent base 11 is not limited to these dimensions.

As the material of the lens layer 12, a resin having visible light transparency may be used. The resin having visible light transparency includes acrylic, polycarbonate, epoxy, polyethylene, polypropylene, and the like. The thickness of the lens layer 12 can be not less than 1 μm and not more than 100 μm.

Among them, when a thermoplastic resin or ultraviolet-curable resin R is used, a lens layer 12 having a split lens structure 20 with reversed convexo-concaves to those of the stamper structure 200 can be easily manufactured by a transfer using the stamper structure 200 to be described later. In the present embodiment, an ultraviolet-curable resin R, which causes little shape deformation after forming, requires no cooling process, and has high productivity, is used. As the ultraviolet-curable resin R, a resin including, for example, a compound containing a reactive group such as a (meth-) acryloyl group, a vinyl group, or an epoxy group, and a compound that generates an active species, such as a radical or cation capable of reacting with the reactive group-containing compound by ionizing radiation such as ultraviolet radiation, can be used.

In particular, from the viewpoint of the curing speed, a combination of a reactive group-containing compound (monomer) containing an unsaturated group such as a (meta-) acryloyl group or a vinyl group, and a photoradical polymerization initiator that generates a radical by light, is preferable. Among them, (meth-) acryloyl group-containing compounds such as (meth-) acrylate, urethane (meth-) acrylate, epoxy (meth-) acrylate and polyester (meth-) acrylate are preferable.

As the (meth-) acryloyl group-containing compound, a compound containing one or two or more (meth-) acryloyl groups can be used. In addition, the above-described reactive group-containing compounds (monomers) containing an unsaturated group such as an acryloyl group or a vinyl group may be used alone or in a mixture as required.

As the photoradical polymerization initiator, various commercial items can be used. The photoradical polymerization initiator is preferably mixed to constitute 0.01 to 10% by weight, in particular 0.5 to 7% by weight, of the whole composition. The mixed amount preferably has this upper limit from the viewpoint of the curing characteristics of the composition, the mechanical characteristics and optical characteristics of the cured material, handling, and the like, and preferably has this lower limit from the viewpoint of preventing a decrease in the curing speed.

If necessary, the ultraviolet-curable resin R may contain various additives, such as an antioxidant, an ultraviolet absorber, a light stabilizer, a silane coupling agent, a coating surface improver, a thermal polymerization inhibitor, a leveling agent, a surfactant, a coloring agent, a preservation stabilizer, a plasticizer, a lubricant, a solvent, a filler, an anti-aging agent, a wettability improving agent, a releasing agent, and the like.

Next, a method for manufacturing the optical element 10 by using the manufacturing apparatus 100 will be described. As shown in FIG. 2, the manufacturing apparatus 100 includes, as a mechanical section, a conveying mechanism 110 for conveying a film-like transparent substrate 11. The manufacturing apparatus 100 further includes a resin supply section 120 disposed along the flow of the transparent substrate 11, a heating section 130, an ultraviolet-curable resin transfer molding mechanism 140, and a peeling mechanism 150.

The resin supply section 120 supplies an uncured ultraviolet-curable resin R onto the transparent substrate 11. The heating section 130 heats the ultraviolet-curable resin R, and performs preliminary curing. The ultraviolet-curable resin transfer molding mechanism 140 includes a mold roll 141, a pressing roll 142 that presses the transparent substrate 11 to the mold roll 141 side, and an ultraviolet application section 143 that applies ultraviolet rays to the ultraviolet-curable resin R and cures the ultraviolet-curable resin R. As the ultraviolet application section 143, a discharge lamp such as a mercury lamp or a metal halide lamp can be used. An LED lamp or the like having an emission wavelength in the ultraviolet range can also be used as the ultraviolet application section 143; however, a lamp suitable for the curing characteristics of the ultraviolet-curable resin R needs to be appropriately selected.

The shape of the mold roll 141 can be formed by methods such as cutting, corrosion, engraving, laser processing, and electron beam processing. When a cylindrical or flat mold is used, an original stamper formed by using these methods may be replicated by a method such as transfer, electrocasting, or the like.

As the material of the mold roll 141, various metals and resins, glass, and the like can be used. The metals include, for example, iron, chromium, nickel, copper, aluminum, and alloys thereof. Plating with a thickness of the order of several micrometers may be applied to the outermost surface of the shape. When a resin or glass is used for the mold roll 141, a cylindrical or flat mold is mainly used.

A stamper structure 200 is provided on the surface of the mold roll 141. As the stamper structure 200, a shape may be directly provided on the mold roll 141, or a cylindrical or flat mold on which a shape is provided may be wound around the mold roll 141. In addition, a film itself manufactured by using the roll molds can be used as a film stamper.

The peeling mechanism 150 has a function of peeling the formed optical element 10 from the mold roll 141.

As shown in FIG. 3, the stamper structure 200 has a reverse structure to the structure of the above-described optical element 10. The stamper structure 200 includes a base portion 201 provided on the mold roll 141 side, and a plurality of lens-like intaglio portions 202 provided on the base portion 201 and corresponding to the split lenses 30.

Furthermore, a groove portion 203 is formed between the lens-like intaglio portions 202. This groove portion 203 corresponds to the rib portion 40. The direction in which the groove portion 203 extends preferably matches the direction in which the transparent substrate 11 is conveyed. The width of the stamper structure 200 is in the range from 0.1 to 1.5 m along the conveying direction in general in accordance with the width of the transparent substrate 11, but is not limited to this.

In the manufacturing apparatus 100 accordingly manufactured, the transparent substrate 11 is conveyed by the conveying mechanism 110. The resin supply section 120 supplies an uncured ultraviolet-curable resin R onto the transparent substrate 11. The ultraviolet-curable resin R is preliminarily cured by the heating section 130. Furthermore, the transparent substrate 11 is supplied between the mold roll 141 and the pressing roll 142 of the ultraviolet-curable resin transfer molding mechanism 140. At this time, the stamper structure 200 is pressed against the ultraviolet-curable resin R, and the shape is transferred by roll forming. Moreover, the optical element is peeled from the mold roll 141 by the peeling mechanism 150.

The optical element 10 accordingly manufactured has the following effects in the manufacturing process: According to the manufacturing apparatus 100 described above, the groove portion 203 of the stamper structure 200 for forming the rib portion 40 can improve the fluidity of the material constituting the lens layer 12 when forming the optical element 10. When the roll forming is performed at a high speed, the split lens surfaces 32 act as walls for blocking the ultraviolet-curable resin R. Therefore, if the groove portion 203 is not provided in the stamper structure 200, the ultraviolet-curable resin R hardly moves over the split lens surfaces 32, and molding defects such as mixing of air bubbles are caused. Provision of the groove portion 203 allows the ultraviolet-curable resin R to easily move, and thus can improve formability and inhibit defects from being caused. In addition, when air enters between the mold roll 141 and the transparent substrate 11 for some reason, air can escape to the outside through the groove portion 203.

If the groove portion 203 starts or ends in the middle of the split lens structure, the effect of enhancing the fluidity of the ultraviolet-curable resin R cannot be sufficiently obtained. Accordingly, the groove portion 203 needs to be continuously provided from one end to the other end of the split lens structure in such a manner as to divide the split lens structure. Furthermore, the depth of the groove portion 203 is preferably constant in order to provide stable fluidity. Since the groove portion 203 is formed as the rib portion 40 in the optical element 10 having the reverse structure, the height of the rib portion 40 is also preferably constant.

The optical element 10 having the rib portion 40 as described above is manufactured by molding using the stamper structure 200 that includes the groove portion 203 as described above, and can reduce defects and improve productivity. Furthermore, by using the optical element 10, for example, in such a manner as to be attached to printed article, printed article having a visual effect can be manufactured at low cost.

Molding using a process like extrusion molding can be performed by using a continuous film on which the optical element 10 is formed as a film stamper. In this case, the formed optical element 10 has the same groove portion 203 as the initial stamper. Furthermore, the continuous film on which the optical element 10 including the groove portion 203 is formed can also be used as a film stamper.

Figure 4:
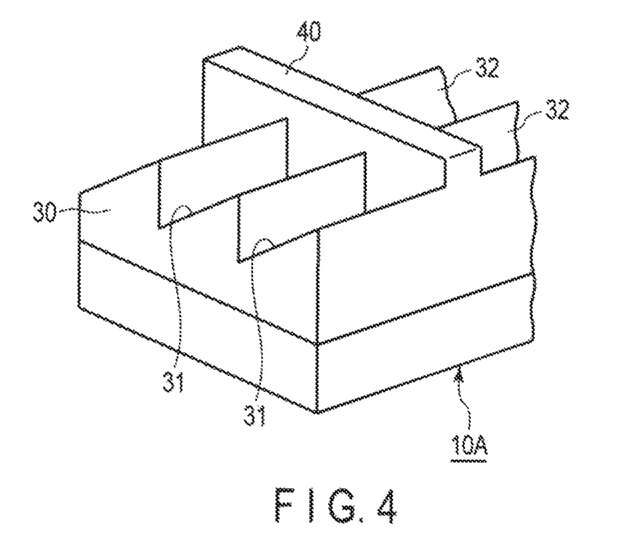
FIG. 4 is a perspective view showing a main part of an optical element according to a second embodiment of the present invention.

Next, another shape of the optical element 10 will be described. FIG. 4 is a perspective view showing a main part of an optical element 10A according to a second embodiment of the present invention, and FIG. 5 is a perspective view showing a main part of an optical element 10B according to a third embodiment of the present invention.

The height of the rib portion 40 is, if it is constant, preferably in the range from 50% to 120% of the height of the split lens structure 20, and more preferably in the range from 80% to 110% thereof. When the height of the rib structure is less than 50%, the effect of improving fluidity by the groove portion 203 is greatly reduced, and defects increase. On the other hand, when it exceeds 120%, the optical performance of the split lens structure 20, which is the original purpose, is deteriorated and, from the appearance, the existence of the rib portion 40 becomes conspicuous. When the height of the rib portion 40 is in the range from 80% to 110%, the problems of fluidity and appearance are hardly observed, and good fluidity and appearance are obtained. When formability is more important, the height can be set to a height close to 110%, and when appearance is more important, it can be set to a height close to 80%.

Figure 5:
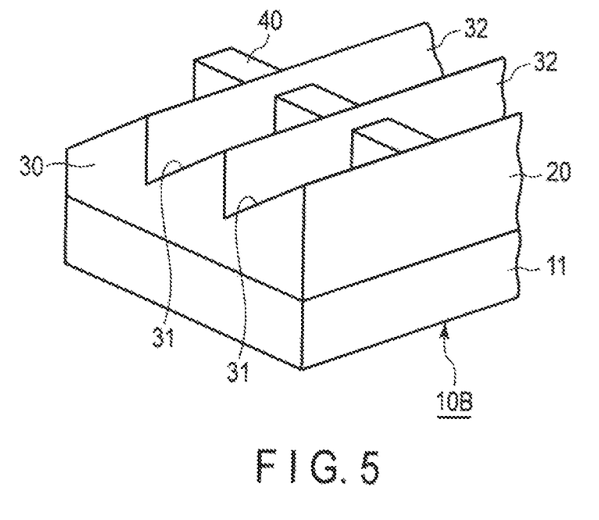
FIG. 5 is a perspective view showing a main part of the optical element according a third embodiment.

FIG. 4 is a perspective view showing a main part of optical element 10A in which the rib portion 40 is higher than the split lens structure 20, and FIG. 5 is a perspective view showing a main part of optical element 10B in which the rib portion 40 is lower than the split lens structure 20. In optical element 10B, the split lens structure 20 is provided on the rib portion 40, and the split lens structure 20 exists at a position where the split lens structure 20 that should be present is higher than the rib portion 40. As a result, both the appearance and optical effect become closer to those of the state where the split lens structure 20 is provided alone.

Figure 6:
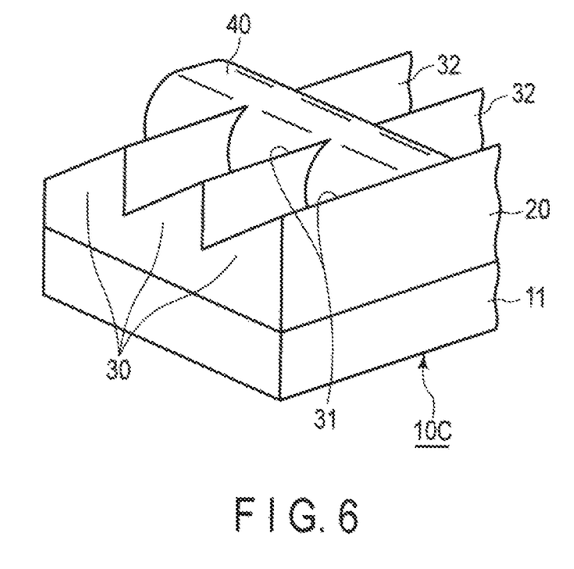
FIG. 6 is a perspective view showing a main part of an optical element according to a fourth embodiment of the present invention.
Figure 7:
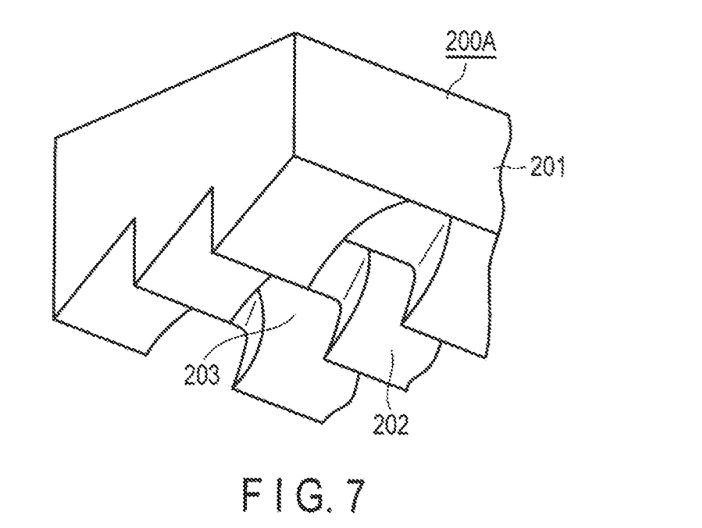
FIG. 7 is a perspective view showing a stamper structure corresponding to an optical element according to another embodiment of the present invention.

FIG. 6 is a perspective view showing a main part of an optical element 10C according to a fourth embodiment of the present invention, and FIG. 7 is a perspective view showing a stamper structure 200A corresponding to the optical element.

As shown in FIG. 6, the rib portion 40 can have various cross-sectional shapes in consideration of the balance between the fluidity and appearance of the ultraviolet-curable resin R. In this case, the stamper structure 200A is formed in accordance with the structure of the rib portion 40 as shown in, for example, FIG. 7, and a prism shape, a cylindrical lens shape, a rectangular shape, or a trapezoidal shape obtained by flattening the top of the prism can be used for the rib portion 40. The optimum value of the cross-sectional area of the rib portion 40 varies depending on the fluidity of the ultraviolet-curable resin R, but is preferably in the range from approximately $0.25 \times Q^2$ to $1.5 \times Q^2$ [μm$^2$] when the height of the split lens structure 20 is Q [μm]. If the cross-sectional area is smaller than this range, the sufficient flow of the lens layer material to inhibit molding defects may not be obtained, and if the cross-sectional area is larger than this range, the optical effect and appearance of the split lens structure 20 may be affected.

When the split lens structure 20 is a linear split lens structure, such as a blazed structure, a linear Fresnel lens structure, or a cylindrical lens array structure, the rib portion 40 is preferably formed linearly in the direction orthogonal to the linear lenses, i.e., the direction orthogonal to the split lens surfaces. However, when the split lens structure 20 is a cylindrical lens array structure in which there is no split lens surface 32 perpendicular to the surface of the transparent substrate 11, the plane passing through the boundary lines between the cylindrical lenses and perpendicular to the surface of the transparent substrate 11 is regarded as a split lens surface 32 for the sake of expedience. This is because such an arrangement is expected to maximize the effect of improving the fluidity of the ultraviolet-curable resin R while suppressing the effect on the appearance. When the split lens structure 20 is a linear split lens structure, a plural rib portions 40 may be provided at intervals.

Figure 8:
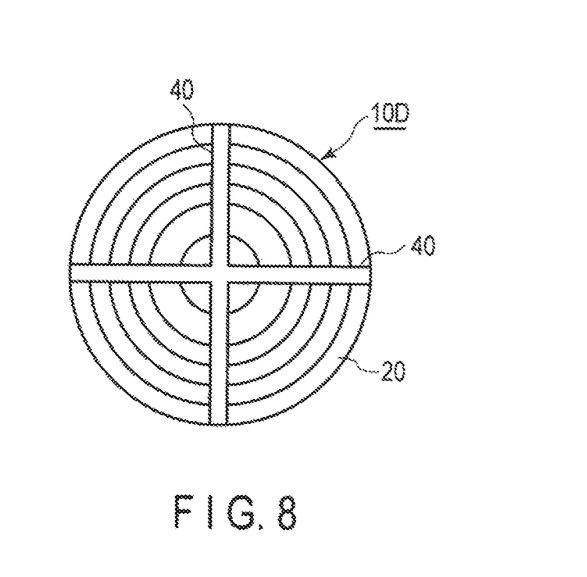
FIG. 8 is a plan view showing an optical element according to a fifth embodiment of the present invention.
Figure 9:
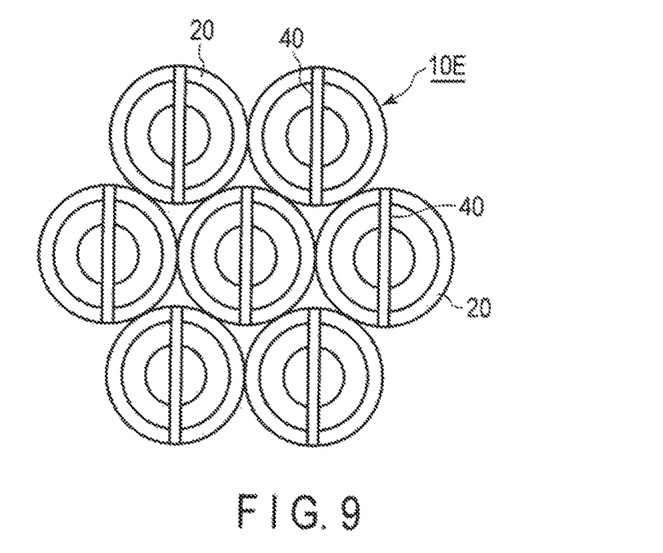
FIG. 9 is a plan view showing an optical element according to a sixth embodiment of the present invention.

FIG. 8 is a plan view showing an optical element 10D according to a fifth embodiment of the present invention, and FIG. 9 is a plan view showing an optical element 10E according to a sixth embodiment of the present invention.

When the split lens structure 20 is a concentric split lens structure such as the Fresnel lens structure shown in FIG. 8 or the micro Fresnel lens array structure shown in FIG. 9, the rib portion 40 is preferably provided linearly to pass through the center of the concentric lens. This is because, if the rib portion 40 does not pass through the center, defects are caused at the center portion of the concentric circle which is not affected by the rib portion 40. In addition, the linear structure is expected to maximize the effect of improving the fluidity of the ultraviolet-curable resin while suppressing the effect on the appearance.

In roll forming of the split lens structure 20, when the split lens surfaces are provided at an angle to be perpendicular to the molding direction, molding defects are most likely to be caused. This is because the split lens surfaces prevent movement of the lens layer material the most when the split lens surfaces are perpendicular to the molding direction. Therefore, it is effective in the concentric split lens structure to provide the rib portion 40 to the split lens surfaces perpendicular to the molding direction that most likely to cause molding defects, that is, to provide the rib portion 40 parallel to the molding direction.

Furthermore, in the case of the concentric split lens structure, a plural rib portions 40 may be provided at different angles. For example, two rib portions may be provided to form an angle of 90°. Alternatively, four rib portions 40 may be provided to form an angle of 45°.

FIG. 8 is a plan view showing an optical element 10D having a concentric split lens structure 20 of the present invention. In this optical element 10D, two rib portions orthogonal to each other are provided. On the other hand, in the micro Fresnel lens array structure in which minute Fresnel lenses are arranged, a linear rib portion passing through the center of the concentric split lens structure is provided for each minute Fresnel lens as shown in FIG. 9.

Figure 10:
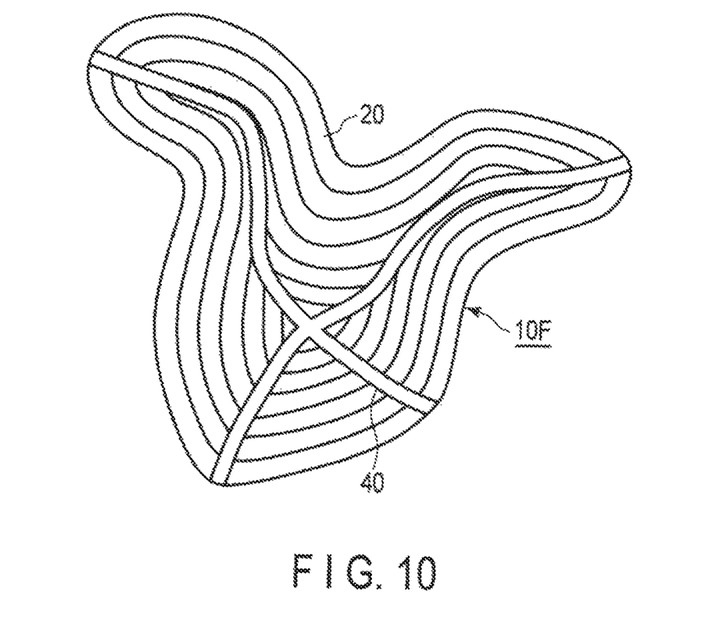
FIG. 10 is a plan view showing an optical element according to a seventh embodiment of the present invention.

FIG. 10 is a plan view showing an optical element 10F according to a seventh embodiment of the present invention. As shown in FIG. 10, when the split lens structure 20 has an irregular shape that is neither linear nor concentric, the rib portion 40 and the groove portion 50 need not be linear, and a plural rib portions 40 and groove portions 50 may be provided at intervals as necessary.

Moreover, a plurality of split lens structures 20 may be provided in a single optical element 10, and may be arranged to express an image, such as a picture pattern, character, number, or the like in combination.

The depth of the split lens structure 20 may be approximately in the range from 1 μm to 50 μm, but is not limited thereto. However, if the film thickness of the lens layer 12 is not enough with respect to the depth of the split lens structure 20, air bubbles are trapped during molding, whereby curing of the ultraviolet-curable resin R is hindered and molding defects are caused; therefore, the film thicknesses of the lens structure 20 and the lens layer 12 need to be appropriately set. For this reason, the depth of the split lens structure 20 is more preferably not more than approximately 10 μm.

On the other hand, the pitch of the split lens structure 20 may be approximately in the range from 1 μm to 100 μm, but is not limited to this. The pitch herein means the interval between split lens surfaces 32. The formability of the split lens structure 20 is affected by the aspect ratio (the value obtained by dividing the depth by the pitch) of the split structures, and the higher the aspect ratio, the lower the formability.

Figure 11:
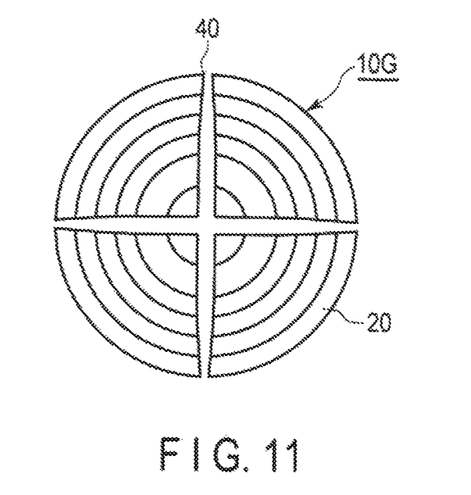
FIG. 11 is a plan view showing an optical element according to an eighth embodiment of the present invention.

FIG. 11 is a plan view showing an optical element 10G according to an eighth embodiment of the present invention. In the optical element 10G, the width of the rib portion 40 may be changed depending on the location. In FIG. 11, in order to improve the forming rate in the vicinity of the outer periphery of the Fresnel lens-type optical element 10G, the rib width of the rib portion 40 is narrowed in the vicinity of the outer periphery. By narrowing the rib width, the fluidity of the molding resin along the rib decreases, so that the molding resin goes around the split lens structure 20, and the forming rate improves. When the molding direction can be determined in advance, it is effective to design the rib width to be narrower on the outlet side with respect to the flow direction of the resin.

Figure 12:
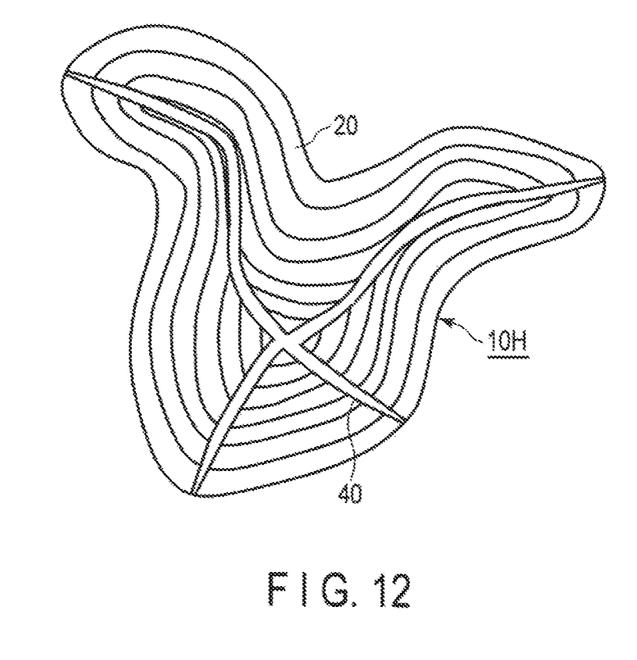
FIG. 12 is a plan view showing an optical element according to a ninth embodiment of the present invention.

FIG. 12 is a plan view showing an optical element 10H according to a ninth embodiment of the present invention. In FIG. 12, regarding the optical element 10H having an irregular-shaped structure, the forming rate of the optical element 10H is improved by increasing the width of the rib portion 40 in a part where the interval in the split lens structure 20 is wide. This is because the molding resin is likely to go around the split lens structure 20 in a part where the rib width of the rib portion 40 changes to become narrow.

The present invention is not limited to the above-described embodiments, and can be modified in practice, without departing from the gist of the invention. In addition, embodiments may be combined as appropriate, in which case a combined effect is obtained. Furthermore, the above-described embodiments include various inventions, and various inventions can be extracted by a combination of structural elements selected from a plurality of disclosed structural elements. For example, even if some structures of all the structures disclosed in an embodiment are deleted, the embodiment from which those structures are deleted can be extracted as an invention as long as the problem to be solved by the invention can be solved, and the effect of the invention can be obtained.

The present invention provides an optical element, printed article, an optical element stamper structure, and a method for manufacturing the optical element suitable for manufacturing an optical element with a surface on which a split lens structure is formed with reduced defects, higher quality, and higher productivity.

What is claimed is:

1. An optical element stamper structure provided on a surface of a mold roll for use in manufacturing an optical element comprising a plurality of split lenses, the optical element stamper structure comprising:
   a base portion;
   a plurality of lens-like intaglio portions provided on the base portion and corresponding to the plurality of split lenses, the plurality of lens-like intaglio portions each extending in a first direction and arranged in a second direction, the second direction crossing the first direction and being parallel with a direction of rotation of the mold roll; and
   a groove portion provided on the base portion and extending in the second direction to intersect the lens-like intaglio portions, the groove portion having a constant structure depth in a range from 50% to 120% of a depth of a lowest point of a lens-like intaglio portion among the plurality of lens-like intaglio portions, wherein the lens-like intaglio portion includes a structure corresponding to a blazed structure, a linear Fresnel lens structure, or a cylindrical lens array structure, in which the plurality of split lenses are arranged in parallel.

2. A method for manufacturing an optical element including a split lens structure including a plurality of split lenses, the method comprising:

providing a transparent substrate film;

supplying a transparent resin onto a surface of the substrate film;

pressing the substrate film by a pressing roll to a mold roll such that the transparent resin is sandwiched between the substrate film and the mold roll, the mold roll including the optical element stamper structure of claim 1, curing the transparent resin; and peeling the substrate film from the mold roll.

* * * * *